Figure 9:
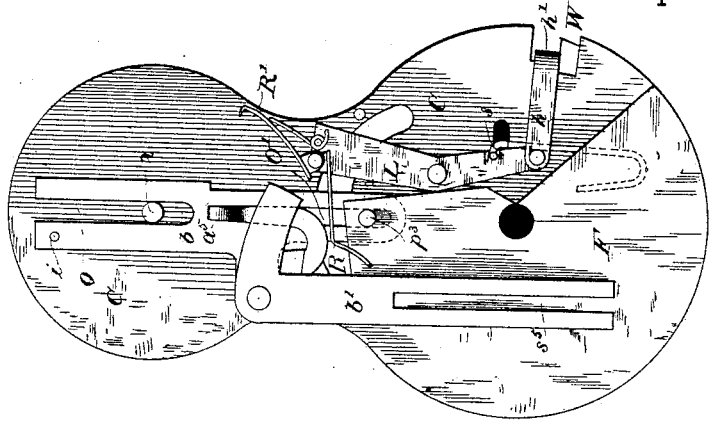

N. A. RANSOM.
FARE REGISTER AND RECORDER.
No. 265,145. Patented Sept. 26, 1882.
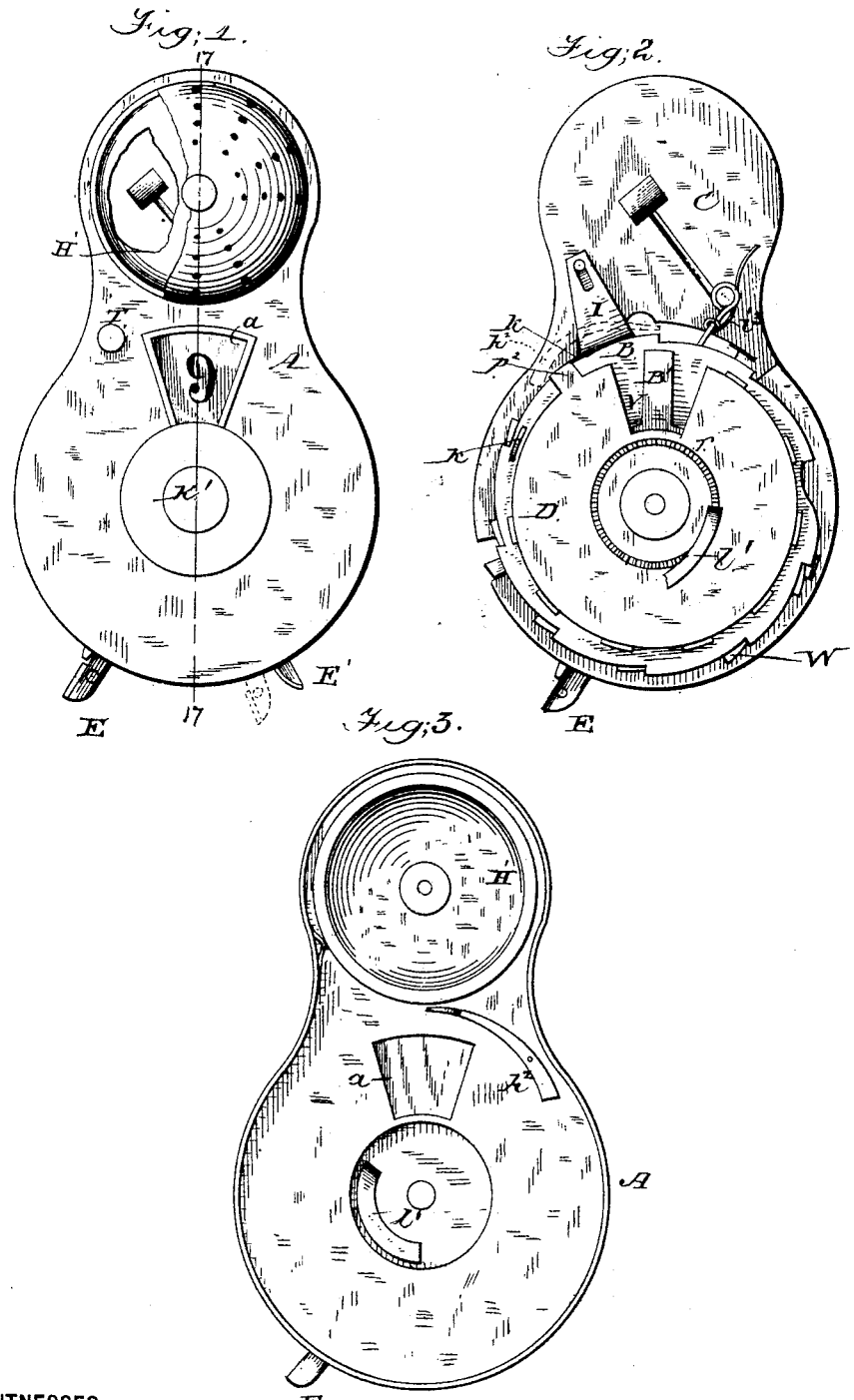
WITNESSES
James Young.
E. C. Davidson.
INVENTOR
Newman A. Ransom,
by his Atty's
Baldwin, Hopkins & Peyton.

N. A. RANSOM.
FARE REGISTER AND RECORDER.
No. 265,145.  Patented Sept. 26, 1882.
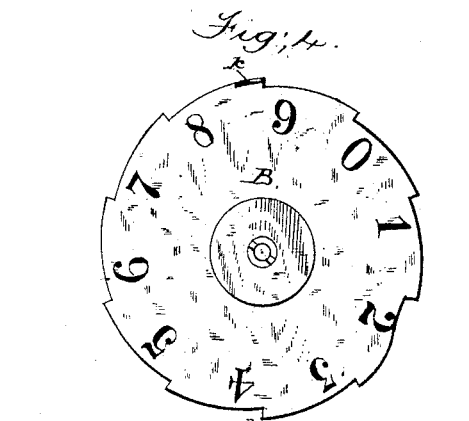
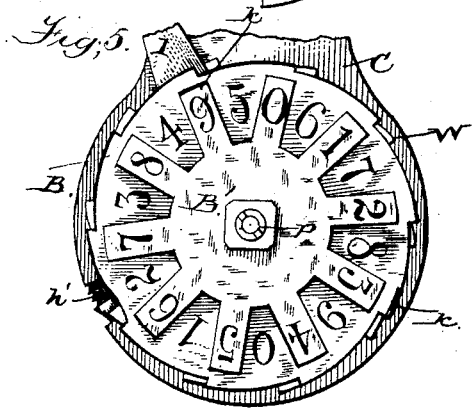
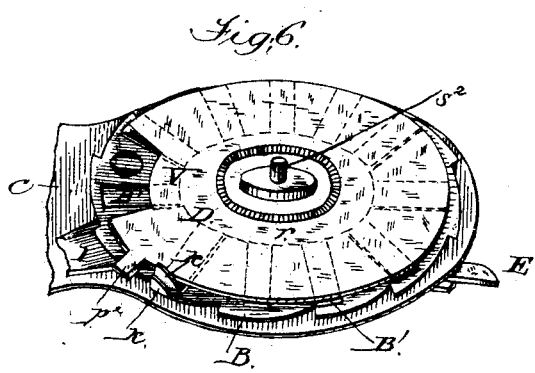
WITNESSES
James Young
E. C. Davidson
INVENTOR
Newman A. Ransom,
by his Attys
Baldwin, Hopkins & Peyton

N. A. RANSOM.
FARE REGISTER AND RECORDER.

No. 265,145.  Patented Sept. 26, 1882.

WITNESSES
Wm. A. Skinkle
Jos. S. Latimer

INVENTOR
Newman A. Ransom,
By his Attorneys
Baldwin, Hopkins & Peyton

N. A. RANSOM.
FARE REGISTER AND RECORDER.

No. 265,145. Patented Sept. 26, 1882.

Witnesses.
James Young.
E. C. Davidson.

Inventor,
Newman A. Ransom
by his Attys
Baldwin, Hopkins & Peyton

N. A. RANSOM.
FARE REGISTER AND RECORDER.
No. 265,145. Patented Sept. 26, 1882.
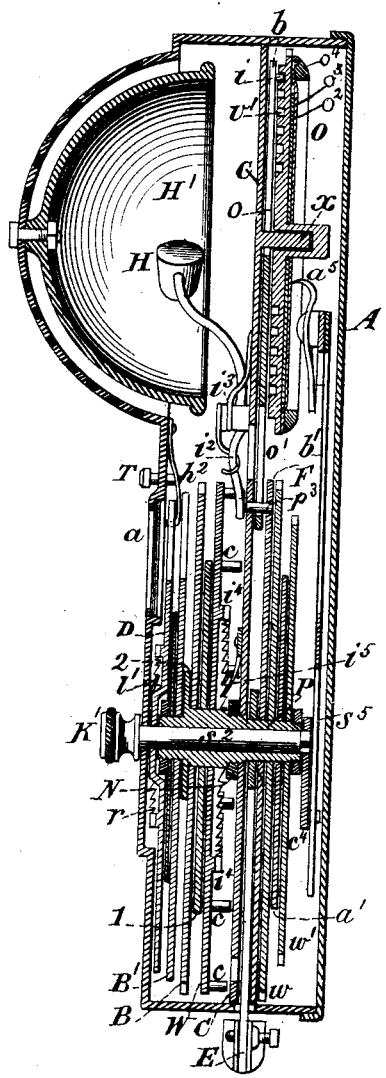
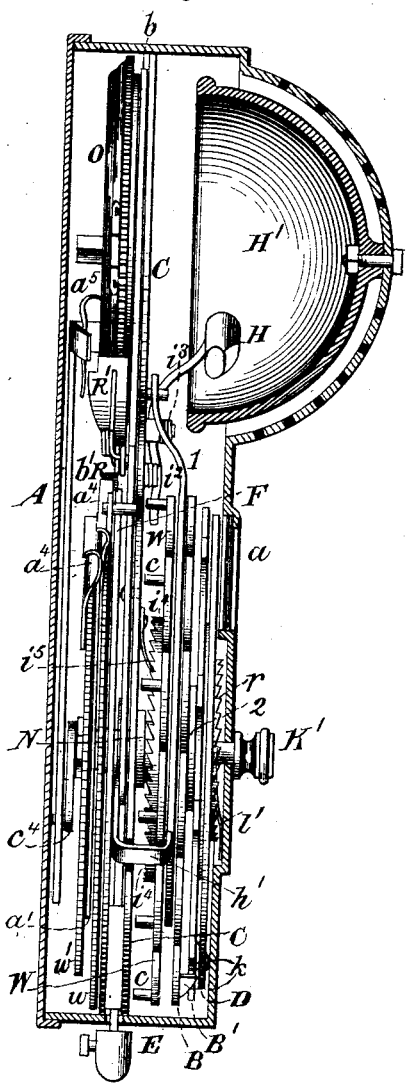
Witnesses.
James Young
O. C. Davidson
Inventor,
Newman A. Ransom,
by his Attys
Baldwin, Hopkins & Peyton

UNITED STATES PATENT OFFICE.

NEWMAN A. RANSOM, OF CHICAGO, ILLINOIS, ASSIGNOR TO THE RAILWAY REGISTER MANUFACTURING COMPANY, OF BUFFALO, NEW YORK.

FARE REGISTER AND RECORDER.

SPECIFICATION forming part of Letters Patent No. 265,145, dated September 26, 1882.

Application filed August 30, 1879.

*To all whom it may concern:*

Be it known that I, NEWMAN A. RANSOM, of Chicago, in the county of Cook and State of Illinois, have invented certain new and useful Improvements in Fare-Registers, of which the following is a specification.

My invention relates more particularly to that class of fare-registering machines which embody the following instrumentalities, to wit: first, a partial or trip register for indicating consecutively the number of fares collected on each trip, and which is capable of being reset to zero or the starting-point; secondly, a total or permanent register for consecutively and permanently registering the total number of fares collected on the several trips; thirdly, mechanism for actuating the trip and total registers simultaneously, or nearly so; fourthly, mechanism for indicating the number of times the partial or trip register has been set to zero to commence registering anew, and consequently the number of trips made; and, fifthly, an alarm apparatus which is sounded once for each fare registered on the trip, and the total registers to audibly announce the proper actuation of the machine.

Registers constructed and organized with the instrumentalities recited prior to my invention have been seriously defective, for the reason that they are not capable of separately showing the number of registrations made for fares collected between the times the partial or trip register is set back to zero or its starting-point; or, in other words, they fail to separately show the number of fares collected on each trip after the trip-register has been reset, and they thus permit of fraudulent manipulations on the part of the conductor or other person intrusted with the collection of the fares, inasmuch as he may neglect to reset the partial or trip register at the end of any one or more trips, and yet escape detection by resetting said register again and again until the appropriate number of trips is indicated before turning in his machine at his employer's office for inspection at the end of the day's work.

To illustrate clearly how frauds may be committed with the old type of machines, let it be supposed that the partial or trip register has been set to zero, the condition of the total-register taken, the condition of the trip-indicating or zero-registering mechanism also taken, and the machine delivered to the conductor. It is the duty of the conductor upon the receipt of each fare to make a registration on his machine, and each actuation thereof is evidenced by the sounding of the alarm and the advance of the numbers on the trip-register consecutively beneath a window or opening in the face-plate of the machine in full view. It is the further duty of the conductor to set his partial or trip register back to zero or the starting-point upon the completion of each trip or half-trip, as the case may be. Now, suppose that on any given trip there should be but eight fares collected, and that, say, sixteen passengers are ready to start back on the return trip. The conductor, taking advantage of his opportunity, may fail to reset or turn his trip-register to zero, and when he comes to take up the fares on the return trip may make only eight registrations or actuations of the machine, which would of course be but for half the number of fares actually collected, although his partial or trip register would indicate plainly that the full number (sixteen) had been registered, a false alarm being employed by the conductor for the remaining eight, if he thinks it necessary. This mode of operation might be repeated several times a day without detection, especially by a conductor skilled in cheating; but as it would not answer to turn in his machine at night for inspection with a smaller number of trips indicated than had actually been made, he, before turning in his machine, sets the partial or trip register at zero, makes one registration, (which is necessary to enable the trip-register to be reset,) turns it back again to zero, makes another registration, and again resets, and so on, repeating the operation until the number of times he resets the trip-register equals the number of times he has failed to reset it at the end of the regular trips during the day. Thus manipulated, the machine passes examination at the inspector's office, and the conductor pockets the amount of fares fraudulently withheld without detection.

To obviate any capability of fraud in the manner stated has been my main object in devising and perfecting my improved machine, the nature of which will hereinafter be fully pointed out.

This present case is subordinate to my original application, filed July 12, 1879, and is a division thereof aimed to cover certain new organizations and combinations of devices particularly set out in the claims at the end of this specification. Said new organizations and combinations are not claimed in the patent subsequently granted on my said original application of July 12, 1879.

The accompanying drawings show my said new combinations of devices as organized in the best way now known to me. It will be understood, however, that some of said new combinations may be used without the others, and in machines differing somewhat in construction from that therein shown.

Figure 7:
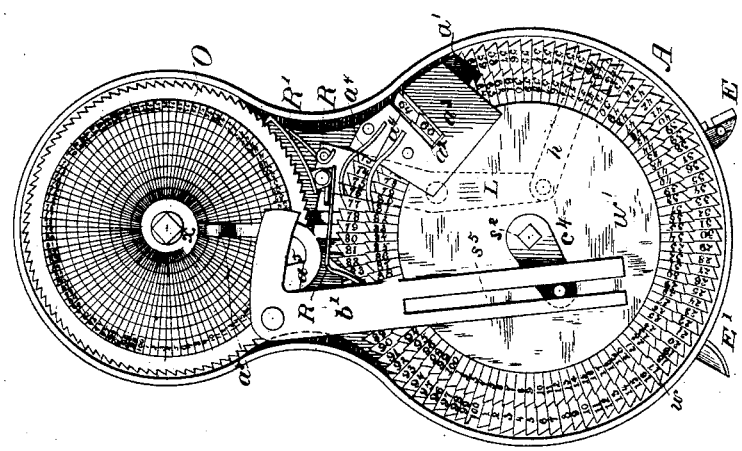
Figure 8:
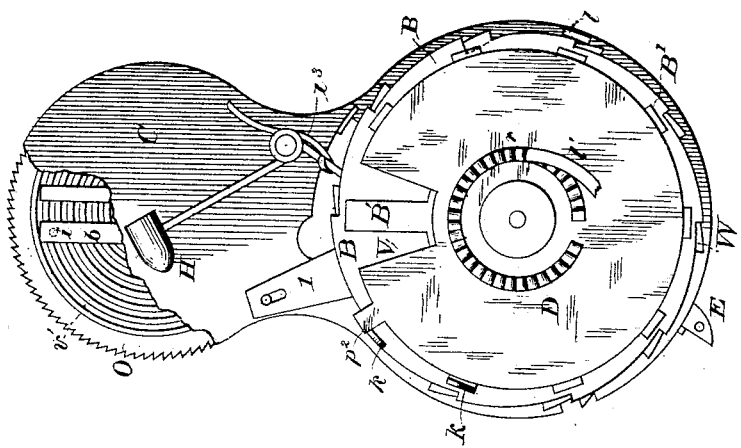
Figure 10:
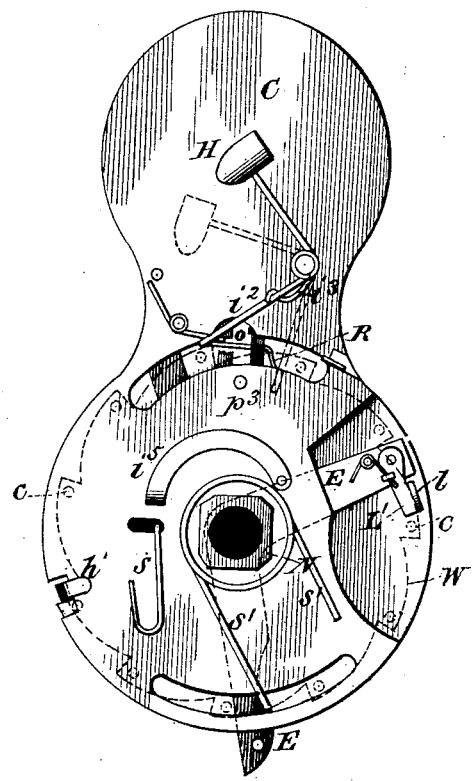
Figure 12:
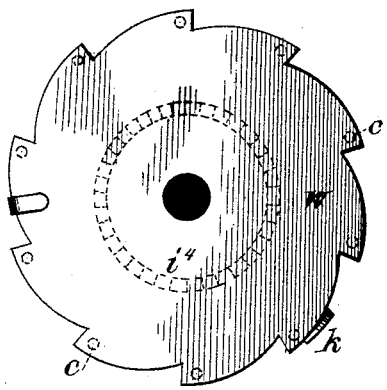
Figure 14:
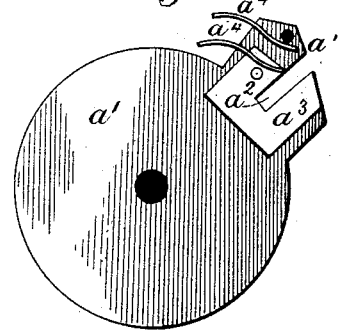
Figure 13:
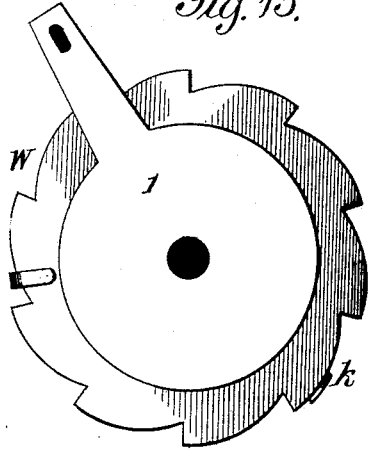
Figure 15:
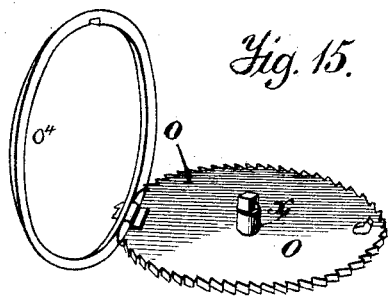
Figure 11:
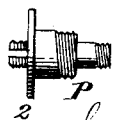

Figure 1 represents a face view of my improved registering-machine. Fig. 2 is a similar view with the inclosing-casing and some of the operative parts removed. Fig. 3 is a view of the interior of the face-plate or cover of the register. Fig. 4 is a face view of the units-wheel of the trip-register; and Fig. 5 is a similar view of the partial or trip register and its supporting-plate, detached. Fig. 6 is a perspective view of the partial or trip register and its turning covering-plate, said plate being the means by which said register is reset to its zero or starting point for each trip. Fig. 7 is a view of the back portion of the machine with the back plate of the casing removed, the total and zero registers facing, and their indications being inspected from that side of the machine. Fig. 8 is a view from the front of a portion of the apparatus, the supporting-plate being broken away at its upper end to show the construction of the back of the zero-register or trip-indicating wheel. Fig. 9 is a view showing the construction and arrangement of the intermediate actuating mechanism by which motion is imparted to the total-register and to the zero or trip recording mechanism simultaneously, or nearly so, with the actuation of the trip register by the prime mover or main actuator of the machine, the view also showing a portion of said recording mechanism. Fig. 10 is a face view of the machine with the casing, partial or trip register, main actuating-wheel, and alarm-bell removed. Fig. 11 is a detached view of the post upon which is mounted the prime mover or main actuator, the main actuating-wheel, the trip-register wheels, and the total-register wheels. Figs. 12 and 13 are views of the main actuating-wheel of the machine; and Fig. 14 is a detached view of the non-rotating isolating-plate, which, when in position, is located between the wheels of the total-register and carries pawls to prevent back movement of said wheels. Fig. 15 is a view of the wheel of the trip-recording mechanism or zero-register, carrying on its face a prepared record sheet or dial. Fig. 16 is a longitudinal section taken through the casing, and showing the inclosed mechanism in elevation; and Fig. 17 is a longitudinal section through the machine on the line 17 17 of Fig. 1.

The inclosing-casing A of the machine is preferably constructed with its upper end smaller than the lower end, to suit the inclosed mechanism as organized in the present example. Within the said casing, parallel with its front and back plates, is mounted a central partition-plate, C, upon which are mounted the operative parts of the apparatus, said supporting-plate being constructed to fit snugly the interior of the casing, and capable of being applied to or removed therefrom when desirable or necessary. A nut, N, is rigidly secured preferably to the front side of said supporting partition-plate C. A tubular non-rotating post, P, is screwed into said nut, so as to form the support and axis of the main actuating-wheel W and the partial or trip register wheels or disks B B', and also the support of the zero gathering or covering plate D upon one side of said partition-plate and the support and axis of the prime mover or actuator E and indicating-wheels $w$ $w'$ of the total or permanent register on the other side of said plate. The main actuating-wheel W lies next the front face of the plate C, and has its periphery provided with ten (more or less) equidistant cam-notches. On the face of the said wheel, (near said notches) next the plate C, is a corresponding number of laterally-projecting pins or studs, $c$. The cam-notches serve a twofold purpose—first, to enable the wheel to be rotated, tooth by tooth, by means of a spring-pawl pivoted to the prime mover or actuating-lever E; and, secondly, for operating a lever, L, by which the total-register and the trip-recording or zero-registering wheel are actuated. The pins or studs $c$ are for the purpose of actuating the alarm apparatus. They strike the shank $i^2$ of a pivoted bell-hammer, H, which lies in the path of their rotation as the wheel is revolved, and thus cause said hammer to rock upon its pivot against the tension of an impelling-spring, $i^3$, so that when released by the continued rotation of the wheel which carries the pin beyond the said shank the hammer is brought down with sufficient force to strike a bell, H', and produce a sharp ring. Said bell is located at the top of the machine, at the front side of the partition-plate C, and is actuated but once for each full actuation of the actuator or prime mover, and consequently but once for each fare recorded. The bell is a concavo-convex one of the usual construction, and is protected by a perforated cap, also of the usual form, which permits the free escape of the sound-vibrations.

In order to prevent back movement of the actuating-wheel W, I provide the back face of said wheel with a circular series of ratchet-teeth, $i^4$, with which a detent-pawl or spring-stop, $i^5$, secured to the front face of the partition-plate C engages. (See Figs. 10, 12, 16, and 17.)

The indicating wheels or disks B B' of the partial or trip register are preferably two in number, located one above the other in front of the actuating-wheel W and upon the same axis, there being interposed between the under or rear trip wheel or disk, B, in this example and said actuating-wheel W a suitable fixed plate or washer, 1, to prevent the independent movements of the trip-disks during their resetting operation from interfering with the said actuating-wheel or turning it. The under or rear one of said trip wheels or disks—that is, the disk B—is the units disk or wheel of the trip-register—that is, it is capable of registering units consecutively, being provided on its face, near its periphery, with the numbers 0 to 9 inclusive, as usual, and having also in said periphery cam-notches corresponding in number and length with those in the actuating-wheel W, though not so deep, (the tenth notch, however, being deeper than the rest,) with which notches the driving-pawl L' of the actuator-lever or prime mover E engages when the said lever is vibrated upon its axis to advance the said disk the distance of one tooth simultaneously with the advance of the said actuating-wheel and the sounding of the alarm. The front or upper of said trip-disks—that is, the disk B'—is the tens disk or wheel of the trip-register—that is, it is capable of registering tens. Said tens disk B' is shown as consisting of a central portion or hub and ten radial arms or spokes, (see Fig. 5,) the latter being numbered from 0 to 9, and projecting between the numbers on the wheel B. The tens-wheel B' is turned the distance of one tooth only for every complete revolution of the units-disk B, and in order to prevent the movement of one wheel or disk by the other I place an isolating-washer, 2, between them. (See Figs. 16 and 17.)

The prime mover or actuating-lever E, as before stated, is mounted so as to turn or vibrate upon the post P at the back of the partition-plate C. (See Figs. 6, 8, 10, 16, and 17.) This lever is a bent lever, as clearly shown in Fig. 10, and carries at its inner end, within the casing, the driving-pawl L', a point, l, of which projects forward or upwardly through a slot or opening in the partition-plate C, so as to engage the notches in wheel W and units-wheel B of the trip-register and move said wheels step by step as the lever is vibrated by its finger-piece, which projects through a slot at the lower end of the casing. Every time a full movement of the lever E is effected by moving its finger-piece toward the fixed finger-piece E', attached to the casing, the units-wheel is moved the distance of one notch, and a new number is caused to appear at the window a in the casing, while at the same time the actuating-wheel W is also moved the distance of one notch, and the alarm is sounded. At the tenth actuation of the actuating-lever E the driving-pawl L' drops into a notch in the units-disk B deeper than the rest, and said pawl is thus permitted to engage one of the arms or spokes of the tens-wheel B', turning said wheel one point, so that if the trip-register has been started at zero the indication at the window a will be ten fares. This consecutive counting operation may be continued up to 99, which is the limit of capacity of the trip-register in this example, such capacity being amply sufficient for all practical purposes. At the end of every trip or half-trip, as the case may be, it is the duty of the conductor to reset his trip-register, or, in other words, to bring it to the zero or starting point to commence registering anew, and this result I accomplish without moving or interfering with the actuating-wheel W, which is independent of the trip-register wheels and separated by an interposed washer, as before stated, by means of a turning covering-plate, D, broadly patented to me under date of May 14, 1878, as No. 203,773. This plate is secured in front of or above the faces of the trip disks to a spindle or stem, $s^2$, which passes through the hollow supporting-post P, and is adapted to freely turn therein and in the front plate of the casing, as clearly shown in Fig. 17. Said spindle, outside the casing, at the front of the register, is provided with a knob or handle, K', by which it can be conveniently turned to rotate the covering-plate in front of the trip-disks. Said plate is provided with a radial arm or point, $p^2$, which projects slightly beyond the periphery of the units wheel or disk, and is adapted to engage inclined setting-projections $k\ k$ on the face of the disks B B', near the peripheries thereof, the setting-projection of units-wheel B being, in the construction shown, placed a little to the left of the figure 9 and the setting-projection of the tens wheel B' on the end of the arm or spoke marked with the figure 9. The said covering-plate is further provided with a view slot or opening, V, corresponding in shape with the window a of the casing, through which the indication of the trip-register is inspected. As has been before stated, at each complete movement of the actuating-lever its driving pawl will cause the units wheel or disk of the trip-register to advance one number, and when nine registrations have been made, the pawl having reached the deep notch in said units-wheel, will drop down and come into engagement with one of the arms of the tens-disk and carry said disk forward until the number on the next arm is exhibited at the window. During the forward movements of these disks the setting-projections $k\ k$, especially the one on the units-disk, must frequently pass the projecting arm or point $p^2$ of the covering-plate. To enable them to easily pass said arm $p^2$ said projections are inclined downwardly in the direction of rotation of the disks, as clearly shown in Fig. 6, and, as they come in contact with the said arm or point, it is slightly wedged up or raised by the inclines, and springs back again after the projections, or either of them, have passed, the elasticity of the metal readily permitting such movement.

The covering-plate D is prevented from rotation to the right, or in the direction opposite to that in which the disks B B' rotate, by means of a circular ratchet, r, secured to its outer or front side or formed thereon, as shown in Figs. 2, 6, 8, 16, and 17, and a spring pawl or detent, l', fixed to the interior of the front plate of the casing and adapted to engage said ratchet. Said covering-plate is prevented from being rotated by the forward movement of the trip-disks B B' by means of a spring catch or holder, $h^2$, secured to the interior of the front plate of the casing, as shown in Figs. 3 and 17, and located in the path of the end of the radial projecting arm or point $p^2$. A short pin or shank is fixed to the back of the said catch $h^2$, and, projecting through the casing, terminates in a small knob or button, T. (Shown in Figs. 1 and 17.) When the end of the trip is reached the conductor presses upon the knob T, which releases the catch $h^2$ from the point or arm $p^2$. He then rotates the covering plate to the left, or in the direction of rotation of the trip-disks, by means of the knob or handle K', causing the arm $p^2$ of said plate to engage the vertical or abrupt sides of the setting-projections k, one after the other or both together, according to their position in the circle in which they move, thereby carrying the disks, by their projections k k, around until the arm $p^2$ again comes in contact with the holder or catch $h^2$. The mechanism is so organized that when this point is reached the view-slot of the covering-plate is exactly opposite the window a in the casing, while the zero-point of the trip-register only is exposed to view. The unbroken part of the covering-plate D entirely covers the trip-disks B B' and screens them from view while they are being reset or brought to the zero or starting point. Said plate cannot be rotated backward, by reason of the pawl and ratchet before mentioned, while it is obviously impossible to rotate the plate forward less than a full revolution to show any number whatever at the window a, or to rotate it a full revolution and display any other figure than zero.

It has been stated that the actuating-lever E vibrates about the post P, so that the pawl L' upon its inner end may actuate step by step (or a tooth at a time) the main actuating-wheel W and the wheels or disks B B' of the trip-register. A spring, s', automatically restores the lever to its normal position after each actuating movement, so that the lever is ready for a new movement, which is to add to the count or tally.

It has also been stated that the wheel W, by its cam-notches, serves to operate a lever, L, which in turn actuates the total-register and zero or trip recording wheel. Said intermediate lever, L, is pivoted to the back of the partition-plate C, and articulated to its lower end is a bar, h, the free end of which is bent forward at right angles, so as to form a hook or portion, h', which is fitted to play back and forth in a lateral slot in said partition-plate and engage successively the cam-notches in the periphery of the actuating-wheel W as said wheel is actuated by the prime mover or actuating-lever E. A spring, s, acts upon the lower end of said lever L and operates to maintain the hooked end of the jointed bar h at all times in engagement with the cam-notches of the wheel W. The upper end of said intermediate lever, L, carries two spring-pawls, R R', the former of which operates the wheels of the total-register and the latter the wheel of the trip-recording or zero-registering mechanism.

The total or permanent register is of simple construction. It consists of two graduated wheels, w w', mounted upon the axis-post P, around which they turn when actuated, an isolating-plate, a', (clearly shown in Fig. 14,) being placed between the said wheels to prevent the motion of one being communicated to the other. The wheel w' is of slightly-smaller diameter than the wheel w, and is placed back of said last-mentioned wheel. Each of said wheels is provided with peripheral notches or teeth, numbered consecutively from zero to one hundred. Each time the main actuating-wheel W is operated by the prime mover E the lever L is rocked upon its pivot by having its lower end carried toward the edge of the partition-plate, owing to the rise of the bar h upon the cam-surface of the said wheel, and thus the upper end of said lever L is caused to move inward or toward the center of the apparatus. This movement brings the pawl R into engagement with the teeth of the wheel w, moving it the distance of one tooth or one point, and said wheel is moved consecutively one tooth after another—one tooth for each operation of the prime mover E—and consequently it registers the same number as is registered upon the partial or trip register in the course of a trip; but, unlike the trip-register, the total-register is incapable of being reset at will, and is intended to preserve a permanent and continuous record of the fares collected on a large number of trips. When the first of the total-register wheels has made a complete revolution, or, in other words, has registered one hundred fares, the pawl R, in making the one-hundredth registration, has reached a notch deeper than the previous ones, and, dropping down therein, engages with the first notch of the second wheel, w', whereby said second wheel is advanced one point, and indicates that a hundred fares have been registered, while the first wheel stands at its zero or starting point. Thus it will be seen that the total-register, while registering evenly with the trip-register, has a very large capacity for continuous registration, being capable of registering 9,999 fares, which is deemed to be a capacity sufficient for the total-register. The total-register faces toward the back of the machine, and the state of the register may be ascertained by observing the numbers beneath the slot $a^2$ in a plate, $a^3$, covering the register-wheels, as shown in Fig. 7, which plate also carries two spring-pawls, $a^4 a^4$, one for each wheel w w', to prevent back rotation of the total-register.

I have thus far described the partial or trip register, which indicates the number of fares registered during the current trip, and also the total-register, which preserves a record of all the fares registered on the several trips.

I will now describe a mechanism by which the number of times the trip-register is reset or brought to the zero or starting point by its resetting mechanism is indicated, together with the number of registrations made prior to each and every time of resetting. I do not wish to be limited to the particular construction of parts shown for accomplishing this result, as other forms of mechanism might be employed which would probably be equally effective.

A wheel, O, (which I term the "trip-recording" or "zero-registering" wheel,) is mounted upon a stud, $x$, projecting from the back of the partition-plate C, as shown in Figs. 9 and 17, and said wheel turns around said stud as an axis. The periphery of the trip-recording wheel O is provided with ratchet-teeth, which are engaged by the pawl R', before mentioned, carried by the intermediate actuating-lever, L, so that every time the said lever is vibrated to actuate the total-register the trip-recording wheel is advanced one point or the distance of one tooth, and thus keeps an even consecutive tally with the total and partial or trip registers. The face of the said wheel O fronts toward the back of the casing, while the back of said wheel faces the front of the casing. The back surface of said wheel is provided with a spiral or volute groove, $v'$, in which a stud or pin, $i$, projecting upward from a bar, $b$, works, said bar $b$ resting upon the back of the partition-plate C. (See Figs. 8, 9, and 17.) The bar $b$ is fitted to move endwise, and is guided and prevented from lateral movement by means of slots $o$ $o'$ in its upper and lower ends, the upper slot, $o$, receiving the stud $x$ and the lower slot, $o'$, a guide-pin, $p^3$, located between the partition-plate C and a plate, F, between which plates the actuating-lever E vibrates. Said bar $b$ is provided with a laterally-projecting arm, which is bent outward and backward, so as to project slightly beyond the plane of the upper surface of the trip-recording wheel, and forms a support for a spring marking-arm, $a^5$, and a pivotal point for a swinging arm or lever, $b'$. The front face of the wheel O is covered with some porous or yielding substance, $o^2$, Fig. 17, which is easily pressed or indented by a pointed instrument, and upon this surface so prepared is placed a disk, $o^3$, of paper or other suitable material, and there held in position by a hinged ring, $o^4$, as shown in Figs. 15 and 17, or by any other proper means. The said paper disk is marked upon its face with a scroll or volute line corresponding with the scroll or volute groove in the back side of the wheel O, and is divided off by radial lines, which are consecutively marked in numbers in the spaces formed by the crossings of the volute line, increasing from zero upward in the direction opposite to that in which the wheel O is rotated, and from the outer extremity of said radial lines inward. It will be evident that as the trip-recording wheel O is rotated step by step by its actuating-pawl R' the volute groove $v'$, acting upon the pin $i$ of the bar $b$, will give a longitudinal or endwise movement to said bar, and, consequently, also to the marking-arm $a^5$ over the face of the paper disk and along the volute line thereof. Now, the radial lines on the paper disk are so distanced, and the various operative parts of the mechanism so proportioned and timed in their operation, that the advance of the wheel O one tooth by its pawl R' will be indicated on the paper disk by the next succeeding numbered radial line coming under the point of the marking arm $a^5$, and, inasmuch as the pawl R' is only moved to actuate the wheel O when the prime mover or actuating-lever E has performed a complete movement, it follows that the exact number of fares registered will be indicated on the paper dial, as well as on the trip and total registers. It is also now evident that to attain the main object of my invention—namely, to produce a record of the exact number of registrations made between the times of resetting the partial or trip register to zero, or, in other words, to produce a permanent record of the number of fares collected and registered on each separate trip—it is only necessary to provide means for pressing down the point of the marking-arm $a^5$ every time said trip-register is reset or brought to zero by the resetting mechanism, so as to puncture or indent the paper dial at the number on the radial line beneath said point, and thus indicate by a comparison of the number so punctured or indented with the number last punctured or indented, or zero, as the case may be, the exact number of registrations made since the last resetting or turning to zero of the trip-register.

The means which I have shown for effecting the depression of the point of the marking-arm to produce the punctures or marks in the paper dial consist of the pivoted lever $b'$, before alluded to, and a crank, $c^4$, made fast to the rear or inner end of the spindle $s^2$, to which the turning covering-plate D is fastened. The pin of the crank $c^4$ is capable of playing back and forth in a longitudinal slot, $s^5$, in the lower arm of the lever $b'$, and when said crank is rotated imparts to said lever a vibratory movement. The upper arm of said lever $b'$ normally bears lightly upon the back of the marking-arm $a^5$, near the lower end thereof; but when the lever is vibrated by the action of the crank said arm moves upward, and, overcoming the elasticity of the marking-arm, presses it down, causing its point to come in contact with the paper dial and puncture or mark it at the number marked on the radial line immediately under said point.

As was before observed, a complete movement of the prime actuating-lever causes the partial or trip register, the total-register, and the wheel O all to move concurrently and indicate the receipt of a fare. Now, when the conductor turns the trip-register to zero or resets it the rotation of the covering-plate necessitated by such operation will also rotate the crank $c^4$ and cause the lever $b'$ to depress the point of the marking-arm $a^5$ and make an indentation or mark in the paper disk or dial, as aforesaid. By this arrangement the conductor is unable, as heretofore, to appropriate fares and by shrewdly manipulating his machine escape detection, inasmuch as not only is the number of trips permanently indicated, but also the number of fares collected on each trip. He cannot, therefore, as with the old type of zero-registering machines, neglect to reset the trip-register at the end of a trip or trips, and then before turning in his machine advance and reset said trip-register, so as to indicate simply the full number of trips made by him during the day, because such proceeding will at once be detected by inspection of the record on the paper dial. A great saving is consequently effected to the company or proprietor.

The back of the casing of the register is intended to be hinged and fastened by a lock, keys to which are held by the officers of the company.

The paper dials should have the capacity of recording the greatest number of fares liable to be registered on the machine in one day, and each night the inspector removes the old dial and applies a fresh one for the next day's work.

I do not claim in this division of my original application of July 12, 1879, anything covered by the claims of the patent of April 20, 1880, issued upon said original application. This division is aimed to cover certain new combinations not claimed in my said patent of April 20, 1880, nor omitted therefrom by inadvertence, accident, or mistake.

I am aware of the English Patent No. 2,136 of 1869, and do not claim herein anything shown in said patent. The apparatus described in the said patent is a game-register, and not a fare-register, and it could not be used for fare-registering purposes to prevent fraudulent peculation on the part of the conductor without material alteration and additions. Said apparatus, moreover, has no total-register in the sense used in this case, nor does it have an alarm apparatus, both of which are essential to fare-registering machines.

I claim herein as of my own invention—

1. The combination, substantially as hereinbefore set forth, of the trip-register, the total-register, and the zero-register wheel with driving-connections to operate said registers and wheel simultaneously, or nearly so.

2. The combination, substantially as hereinbefore set forth, of the trip-register, the total-register, the zero-register wheel, the driving-pawls to operate said registers and wheel simultaneously, or nearly so, and the alarm apparatus sounded once for each actuation of said registers and wheel.

3. The combination, substantially as hereinbefore set forth, of the trip-register actuated by the prime mover or actuating-lever, the main actuating-wheel, also actuated by said lever, the total-register, and an intermediate vibrating pawl-carrying lever operated by said actuating-wheel to move the total-register concurrently with the trip-register.

4. The main actuating-wheel constructed, substantially as hereinbefore set forth, with, first, the cam-notches in its periphery; second, the pins corresponding in number to said notches to actuate the bell-hammer, and, third, the circular ratchet upon its side for the engagement of a detent to lock the wheel from back rotation.

5. The combination, substantially as hereinbefore set forth, of the trip-register disks having inclined setting-projections thereon, the turning covering-plate having a projecting arm to act upon said setting-projections, the circular ratchet upon the front face of said plate, to be engaged by a detent on the inside of the casing to prevent back rotation of said plate, and the catch controlled by a knob from the outside of said casing to normally engage the projecting arm of the covering-plate and prevent its forward movement.

6. The combination, substantially as hereinbefore set forth, of the wheels of the total-register having actuating-notches in their peripheries, the washer interposed between said wheels, and the slotted plate connected with said washer overlapping the numbered edges of said wheels, and so organized as to permit the record of the total-register to be ascertained through the slot.

7. The combination, substantially as hereinbefore set forth, of the recording-wheel, the dial carried by said wheel, the trip-register, mechanism for moving said recording-wheel and said trip-register concurrently in the process of counting, so that both register the same number of fares, and a marker to mark or indent said dial each time the trip-register is reset, and then only, whereby the number of times the trip-register is reset is indicated, as well as the number registered between the times of resetting said register.

8. The combination, substantially as hereinbefore set forth, of the zero-register wheel, (capable of an intermittent rotary movement,) having a scroll or volute groove at its back, with a dial applied to the face of said wheel, having a volute line and numbered radial lines marked thereon.

9. The combination, substantially as hereinbefore set forth, of the casing, the partition-plate separating the trip from the total register, and the tubular non-rotating post secured to said plate to support said registers and permit a turning spindle to pass through it.

10. The zero-register wheel constructed, substantially as hereinbefore set forth, with a scroll-groove at its back, a seat on its face for a recording-dial, and operating-notches in its periphery.

11. The combination, substantially as hereinbefore set forth, of the main actuating-wheel having actuating-notches in its periphery, the trip-register disks, also actuated by notches or recesses in their peripheries and rotating about the same axis as the main actuating-wheel, and the prime mover having a single driving-pawl to operate said wheel and disks.

12. The combination, substantially as hereinbefore set forth, of a trip-register for consecutive counting, an actuator to operate said trip-register, a device independent of said actuator to reset said trip-register, a graduated paper dial upon which a permanent record of the counting actuations given to the trip-register is made, and a marker to mark or indent said dial.

13. The combination, substantially as hereinbefore set forth, of a trip-register for consecutive counting, an alarm sounded for each actuation of said register in the counting process, an actuator for operating said register and alarm simultaneously, or nearly so, a device independent of said actuator to reset said register, a graduated paper dial to permanently record the counting actuations given the trip-register by its actuator, and a marker to mark or indent said dial.

14. The combination, in a fare-register, substantially as hereinbefore set forth, of a graduated paper dial to receive marks or indentations to permanently record the number of fares received, with an alarm apparatus operated by the actuator of the register for each fare received, whereby frauds are prevented.

15. The combination, substantially as hereinbefore set forth, of the graduated paper dial to receive marks or indentations indicating the number of fares received, with a yielding backing or cushion against which said dial is fastened, whereby said dial is readily indented or punctured by a marker to make a permanent record of the fares collected.

16. The combination, substantially as hereinbefore set forth, of the graduated paper dial to receive marks or indentations indicating the number of fares received, the yielding backing or cushion against which said dial is fastened, so that it may be readily indented or punctured to make a permanent record of the fares collected, and a yielding marking arm to indent or puncture the dial.

17. The combination, substantially as hereinbefore set forth, of the trip-register, the alarm, the actuator for operating said register and alarm simultaneously, or nearly so, the graduated paper dial, and mechanism, substantially as described, whereby said dial will show at the end of a predetermined time by radial and spiral lines the aggregate of the number of fares recorded by the trip-register and alarm sounded in registering them.

NEWMAN A. RANSOM.

Witnesses:
A. G. LUNDBURG,
R. J. STONE.